United States Patent
Yarmey et al.

(10) Patent No.: US 6,579,923 B2
(45) Date of Patent: Jun. 17, 2003

(54) USE OF A SILICONE SURFACTANT IN POLISHING COMPOSITIONS

(75) Inventors: Susan K. Yarmey, St. Paul, MN (US); Adriana Paiva, Woodbury, MN (US); Augustine C. Liu, Bloomington, MN (US); Jimmie R. Baran, Jr., Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 107 days.

(21) Appl. No.: 09/777,043

(22) Filed: Feb. 5, 2001

(65) Prior Publication Data

US 2002/0147258 A1 Oct. 10, 2002

(51) Int. Cl.$^7$ ................................ C08L 5/24
(52) U.S. Cl. .................. 524/262; 524/261; 524/265; 524/266; 106/3
(58) Field of Search ............... 106/3; 524/262, 524/265, 266

(56) References Cited

U.S. PATENT DOCUMENTS

| | | | |
|---|---|---|---|
| 2,937,098 A | 5/1960 | Geen ..................... 106/10 |
| 3,163,547 A | 12/1964 | Vietor ..................... 106/6 |
| 3,306,869 A | 2/1967 | Lahr et al. ............... 260/24 |
| 3,429,842 A | 2/1969 | Wolstoncroft ........... 260/28.5 |
| 3,554,790 A | 1/1971 | Gehman et al. ......... 117/161 |
| 3,728,418 A | 4/1973 | Gleason ................. 260/898 |
| 3,779,774 A | * 12/1973 | Cope et al. ............. 96/87 R |
| 3,856,533 A | * 12/1974 | Schnurrbusch et al. .... 106/10 |
| 4,017,662 A | 4/1977 | Gehman et al. ......... 428/443 |
| 4,070,510 A | * 1/1978 | Kahn ..................... 427/385 R |
| 4,093,642 A | * 6/1978 | Schilling et al. ......... 544/106 |
| 4,131,585 A | 12/1978 | Feigin .................... 260/29.6 |
| 4,139,546 A | * 2/1979 | Berger et al. ........... 260/448.2 |
| 4,168,255 A | 9/1979 | Lewis et al. ............. 260/29.6 |
| 4,317,755 A | 3/1982 | Gregory ................. 524/276 |
| 4,354,871 A | * 10/1982 | Sutton .................... 106/3 |
| 4,421,782 A | 12/1983 | Bolgiano et al. |
| 4,517,330 A | * 5/1985 | Zdanowski et al. ...... 524/408 |
| 4,631,273 A | * 12/1986 | Blehm et al. ............ 514/29 |
| 4,784,799 A | * 11/1988 | Petroff ................... 252/545 |
| 4,859,359 A | * 8/1989 | DeMatteo ............... 252/174.15 |
| 4,923,514 A | 5/1990 | Brown .................... 106/11 |
| 4,960,845 A | * 10/1990 | O'Lenick, Jr. .......... 528/25 |
| 4,986,922 A | * 1/1991 | Snow et al. ............. 252/8.8 |
| 5,026,489 A | * 6/1991 | Snow et al. ............. 252/8.8 |
| 5,068,380 A | * 11/1991 | Meguriya et al. ....... 556/428 |
| 5,124,466 A | * 6/1992 | Azechi et al. ........... 556/425 |
| 5,466,529 A | * 11/1995 | Czech .................... 428/395 |
| 5,688,844 A | 11/1997 | Chatterji et al. .......... 524/8 |
| 5,691,392 A | * 11/1997 | Okoroafor et al. ....... 521/112 |
| 5,753,758 A | * 5/1998 | Marchese ................ 525/201 |
| 5,782,962 A | * 7/1998 | Burke et al. ............. 106/2 |
| 5,925,607 A | * 7/1999 | Flanagan ................ 510/242 |
| 5,968,238 A | * 10/1999 | Healy et al. ............. 106/3 |
| 6,090,765 A | * 7/2000 | Black et al. ............. 510/238 |
| 2002/0147258 A1 | * 10/2002 | Yarmey et al. .......... 524/262 |

FOREIGN PATENT DOCUMENTS

| | | | | |
|---|---|---|---|---|
| EP | 0 377 209 | | 7/1990 | |
| EP | 0 787 485 A2 | * | 8/1997 | ........... A61K/7/48 |
| EP | 0 839 876 | | 5/1998 | |
| JP | 2-160031 A | * | 6/1990 | ........... B01F/17/54 |
| JP | 6-16684 A | * | 1/1994 | ........... C07F/9/09 |
| WO | WO 02/070618 A2 | * | 9/2002 | ........... C09G/1/04 |

* cited by examiner

*Primary Examiner*—David W. Wu
*Assistant Examiner*—Rip A. Lee

(57) ABSTRACT

An aqueous polishing composition comprising a film forming polymer and an ionic silicone surfactant is described. The polish can be applied to a variety of substrates, particularly to floor surfaces. The coatings are smooth and soil resistant. The polish composition performs as well as state-of-the-art formulations containing a fluorocarbon surfactant.

44 Claims, No Drawings

USE OF A SILICONE SURFACTANT IN POLISHING COMPOSITIONS

FIELD OF THE INVENTION

The invention relates to soil resistant, aqueous polish compositions comprising film-forming polymers and an ionic silicone surfactant.

BACKGROUND OF THE INVENTION

This invention relates to polishing compositions, particularly floor polishes. The suitability of a polish applied to a substrate is often dependent on a variety of physical properties that are affected by the choice of surfactant. For example, the smoothness and the resistance to soiling of a polish can depend on the surfactant. "Smoothness" refers to the uniformity of the coating after the surface applied polish has dried to form a film. "Resistance to soiling" refers to the ability of the polish to retain its appearance after exposure to soil.

Surfactants reduce the surface tension of the polish and thereby improve the wetting and leveling characteristics of the polish. Fluorocarbon surfactants, dating back to the mid-1950s, have been the most popular wetting and leveling agents used by the floor polish industry. These surfactants, further described in U.S. Pat. Nos. 2,937,098 (Geen) and 3,163,547 (Vietor), are typically used at very low concentrations such as about 0.01% by weight of the total formulation. Because the fluorocarbon surfactants can be used at such low levels, they typically pose only minor adverse affects on the final properties such as the soil resistance of the dry polish film.

Many fluorocarbon surfactants contain perfluorooctyl moieties. These surfactants ultimately degrade to perfluorooctyl-containing compounds. It has been reported that certain perfluorooctyl-containing compounds can tend to bio-accumulate in living organisms; this tendency has been cited as a potential concern regarding some fluorochemical compounds. For example, see U.S. Pat. No. 5,688,844 (Baker et al.). As a result, there is a recognized need to replace the fluorocarbon surfactants in floor polishes.

Some non-fluorinated surfactants for floor finishes are known in the art. U.S. Pat. No. 3,728,418 (Gleason) discloses various phosphate compounds. U.S. Pat. Nos. 4,168,255 (Lewis et al.), 4,017,662 (Gehman et al.) and 3,554,790 (Gehman) disclose alkali metal and amine salts of fatty acids having 12 to 18 carbon atoms. U.S. Pat. No. 4,131,585 (Feigin) discusses the use of a non-linear aliphatic hydrocarbon or mixture of hydrocarbons containing 8 to 15 carbon atoms or an alkylbenzene moiety containing 8 to 12 carbon atoms in the alkyl chain as leveling agents.

The use of various nonionic wetting agents, prepared by the addition of ethylene oxide to compounds containing one or more active hydrogen atoms, are disclosed in U.S. Pat. No. 4,017,662 (Gehman et al.). U.S. Pat. No. 4,317,755 (Gregory) recites that nonionic surfactants are preferred, although anionic surfactants can sometimes be used in floor polishes. Preferred nonionic surfactants are the ethylene oxide and/or propylene oxide derivatives of alkyl phenols, aliphatic acids, aliphatic alcohols, glycols, glycol ethers, alkylaryl esters and vegetable oils. U.S. Pat. No. 4,923,514 (Brown) discloses floor polish formulations with surfactants such as nonyl phenol ethoxylates, alkoxylated amine, and ethoxylated fatty amines.

The use of a hydrolytically stable polysiloxane-oxyalkylene block copolymer having a molecular weight below about 25,000 is disclosed in U.S. Pat. Nos. 3,306,869 (Lahr et al.) and 3,429,842 (Wolstoncroft) as a leveling agent in a floor polish.

Most of these non-fluorinated leveling agents must be used at higher concentrations than the fluorinated materials in the floor polish formulations. Consequently, they are more likely to adversely affect important physical properties of the coating such as resistance to soiling. Some surfactants have such high molecular weights that they cannot effectively migrate to the surface of substrate and provide the desired surface tension reduction required for the production of smooth coatings. Moreover, the hydrocarbon surfactants typically do not produce coatings that are resistant to soiling, an important criteria for a polishing composition.

We have provided a surfactant that has minimal adverse affects on the final properties of the dried coating. Ionic silicone surfactants have good wetting and leveling characteristics that facilitate the production of a smooth coating while maintaining good anti-soiling properties. The ionic silicone surfactants perform comparably to state-of-the-art fluorochemical surfactant.

SUMMARY OF THE INVENTION

The present invention provides an aqueous polishing composition comprising an ionic silicone surfactant and a film-forming polymer. The polishing compositions can produce smooth and soil resistant coatings when applied to a substrate such as, for example, floor, wall, and bathroom surfaces. The polishes are particularly well suited for application to floor surfaces. The polish compositions perform as well as state-of-the art formulations containing a fluorocarbon surfactant.

Typically, the polishing composition contains from about 0.01 to about 5.0 weight percent ionic silicone surfactant based on the weight of the polishing composition. The ionic silicone surfactant comprises a silicone group and one or more ionic groups. In one preferred embodiment the ionic group is anionic. Suitable anionic groups include carboxylate, sulfonate, phosphonate, sulfate, phosphate, and the like. Preferably, the anionic group is a carboxylate. A particularly preferred carboxylate group is phthalate. A portion of the anionic groups can be an acidic moiety such as carboxylic acid, sulfonic acid, phosphonic acid, sulfuric acid, phosphoric acid, and the like. The average molecular weight of the surfactant is less than about 10,000.

The film forming polymers are typically acrylic polymers, acrylic copolymers, styrene-acrylic copolymers, or blends thereof. The floor polish compositions can also contain polyvalent metal compounds, alkali soluble resins, waxes, permanent and fugitive plasticizers, defoamers, and biocides.

The solids content of the polishes ranges from about 10 to about 50 weight percent based on the weight of the polish composition. The static surface tension typically ranges from about 18 to about 30 dynes/cm.

Another aspect of the invention provides methods of using the polishing compositions of the invention.

DETAILED DESCRIPTION OF THE INVENTION

The invention provides an aqueous polishing composition comprising an ionic silicone surfactant and a film-forming polymer. The polishing composition can be applied to a variety of substrates such as, for example, floor, wall, and bathroom surfaces. Preferably, the substrate is a floor. The coatings are smooth and resistant to soiling.

The ionic silicone surfactant comprises a silicone group and one or more ionic groups. The ionic group can be either cationic or anionic. Cationic groups include, for example, acidic salts of basic moieties. Suitable cationic groups include the acidic salts of ammonia, amines, amides, and the like. Suitable counter ions for cationic groups are halides, sulfates, carbonates, phosphates, and the like. Anionic groups include basic salts of acidic moieties. Suitable anionic groups include carboxylate, sulfonate, phosphonate, sulfate, phosphate, and the like. Preferred counter ions for anionic groups are alkali metals such as sodium and potassium; alkaline earth metals such as calcium and magnesium; and nitrogen containing cations. The ionic group can be a mixture of acidic and basic salts. A portion of the acidic or basic salts can be in the corresponding basic or acidic forms.

In a preferred embodiment of the invention, the surfactant has an anionic group that is a carboxylate. Suitable carboxylate groups include, for example, benzoate, phthalate, acetate, formate, glycolate, octanoate, gluconate, oxalate, lactate, and the like. Phthalate is particularly preferred. The phthalate ion can be partially in the form of phthalic acid.

The ionic silicone surfactant can further comprise a polyalkylene oxide such as polyethylene oxide, polypropylene oxide, polybutylene oxide, and mixtures thereof. Preferably, the polyalkylene oxide is polyethylene oxide. In one preferred embodiment, the surfactant has a "T" structure with a siloxane backbone and an alkoxy pendant group containing an ionic end group.

The polishing composition typically contains from about 0.01 to about 5.0 weight percent, preferably from about 0.1 to about 2.0 weight percent, and more preferably from about 0.1 to about 1.5 weight percent ionic silicone surfactant based on the weight of the polishing composition. The average molecular weight of the surfactant is typically less than about 10,000 and preferably less than about 6,000.

The film-forming polymers are typically acrylic polymers, acrylic copolymers, styrene-acrylic copolymers, or blends thereof. Acrylic polymers contain only one type of acrylate monomer whereas the acrylic copolymers comprise two or more different types of acrylate monomers. Styrene-acrylic copolymers comprise at least one type of styrene monomer and one type of acrylate monomer. The acrylate monomers include acrylic acid, butyl acrylate, ethyl acrylate, methyl acrylate, 2-ethyl hexyl acrylate, acrylonitrile, acrylamide, methacrylic acid, methyl methacrylate, ethyl methacrylate, butyl methacrylate, methacrylamide, and the like. Styrene monomers include styrene, alpha-methyl styrene, and the like.

Acrylic polymers suitable as film forming polymers include, for example, Mor-glo 2 latex from Omnova Solutions, Inc. of Chester, S.C.

Commercially available acrylic copolymers suitable for polishing compositions include, but are not limited to, methyl methacrylate/butyl acrylate/methacrylic acid (MMA/BA/MAA) copolymers, methyl methacrylate/butyl acrylate/acrylate acid (MMA/BA/AA) copolymers, and the like. MMA/BA/MAA and MMA/BA/AA copolymers are available from Omnova Solutions, Inc. of Chester, S.C.

Suitable commercially available styrene-acrylic copolymers include, but are not limited to, styrene/methyl methacrylate/butyl acrylate/methacrylic acid (S/MMA/BA/MAA) copolymers, styrene/methyl methacrylate/butyl acrylate/acrylic acid (S/MMA/BA/AA) copolymers, and the like. S/MMA/BA/MAA and S/MMA/BA/AA copolymers available from Omnova Solutions, Inc. of Chester, S.C.

The polishing composition typically contains between about 5 and 50 weight percent and preferably between about 10 and 35 weight percent film forming polymers based on the weight of the polishing composition.

The floor polish compositions can also contain polyvalent metal compounds, alkali soluble resins, waxes, permanent and fugitive plasticizers, defoamers, and biocides. The polyvalent metal compound improves cross-linking of the polymers in the film and increases the detergent resistance of the polish. Plasticizers or polymer coalescents can be added to lower the temperature of film formation. Alkali soluble resins improve the ability of the polish to be stripped from the substrate before reapplication of a fresh coating. Waxes improve the gloss of the finish and allow the finish to be buffed. Biocides help minimize the formation of molds or mildew in the coating. Antifoamers and defoamers minimize the formation of bubbles in the coating.

Suitable polyvalent metals include beryllium, cadmium, copper, calcium, magnesium, zinc, zirconium, barium, strontium, aluminum, bismuth, antimony, lead, cobalt, iron, nickel, and the like. Although the polyvalent metal compound can be added to the polish composition in dry form such as a powder, it is preferably added as a solution. The polyvalent metal compound is typically a metal complex, a metal salt of an organic acid, or a metal chelate. The ammonia and amine complexes of these metals are particularly useful because of their high solubility. Amines capable of complexing many metals include, for example, monoethanol amine, diethylaminoethanol, and ethylenediamine. Polyvalent metal complexes and salts of organic acids are typically soluble in an alkaline pH range. Anions of organic acids include acetate, formate, carbonate, glycolate, octanoate, benzoate, gluconate, oxalate, lactate, and the like. Polyvalent metal chelates where the ligand is a bidentate amino acid such as glycine or alanine can also be used.

Zinc and cadmium are preferred polyvalent metal ions. Preferred polyvalent metal compounds include zinc acetate, cadmium acetate, zinc glycinate, cadmium glycinate, zinc carbonate, cadmium carbonate, zinc benzoate, zinc salicylate, zinc glycolate, and cadmium glycolate. In some applications, a fugitive ligand such as ammonia is preferred. A ligand is considered fugitive if at least a portion of the ligand tends to volatilize as the polish dries to form a film on the substrate.

The alkali-soluble resins include copolymers of styrene or vinyl toluene with at least one $\alpha$-$\ominus$-monoethylenically unsaturated acid or anhydride such as styrene-maleic anhydride resins, rosin/maleic anhydride adducts which are condensed with polyols, and the like. The alkali-soluble resins typically have a weight average molecular weight from about 500 to 10,000 and preferably from about 1000 to 5000. The resins are often used as a conventional resin cut, which is an aqueous solution of the resin with an alkaline substance having a fugitive cation such as ammonium hydroxide. The alkali soluble resin is typically employed in amounts from 0 to about 20 weight percent and preferably in amounts from 0 to about 15 weight percent based on the weight of the polish composition.

The waxes or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. The waxes typically range from 0 to about 15 weight percent and preferably from about 2 to about 10 weight percent based on the weight of the polish composition.

The aqueous polishing composition typically contains from about 1 to about 10 weight percent plasticizer based on the weight the polishing composition. The plasticizer facilitates film formation and allows lower temperatures to be used to cure the coating applied to a substrate. Because the polish coatings are often inherently tough and flexible, it is often not necessary to impart additional flexibility to the coating from the plasticizer. Consequently, a fugitive or semi-fugitive plasticizer is preferred over a permanent plasticizer for many applications. A fugitive or semi-fugitive plasticizer is a plasticizer that at least partially evaporates as the coating dries. Permanent plasticizers do not evaporate. Mixtures of fugitive and permanent plasticizers can be used. The particular plasticizer and the amount used are chosen in accordance with the demand for compatibility with the formulation, efficiency in lowering the film-forming temperature, and clarity of the coating.

Fugitive plasticizers or coalescents include, for example, the monobutyl, monoethyl, monomethyl or other monoalkyl ethers of diethylene glycol or dipropyleneglycol, isophorone, benzyl alcohol, butyl cellosolve, and 3-methoxybutanol-1. Permanent plasticizers include, for example, benzyl butyl phthalate, dibutyl phthalate, dimethyl phthalate, triphenyl phosphate, 2-ethyl hexyl benzylphthalate, fatty oil acid esters of caprolactam, acetyl tributyl citrate, toluene ethyl sulfonamide, tributoxyethyl phosphate, and tributyl phosphate. Some plasticizers, such as tributoxyethyl phosphate, can also serve as a leveling agent. Permanent plasticizers can be used without the loss of the soil resistance properties of the polish.

The polish compositions of the invention typically have a solids content from about 10 to about 50 weight percent. In one embodiment the solids range from about 10 to about 30 weight percent and preferably from about 15 to about 25 weight percent based on the weight of the polish composition. In another embodiment of the invention, a concentrated polish composition is provided containing up to about 35 to about 50 weight percent solids based on the weight of the polish composition. Such concentrated compositions are diluted prior to use by either mixing the concentrate with water or by applying the polish with a wet mop or applicator.

The pH of the polish composition is typically in the range of about 6 to about 10.5. Preferably, the pH is between about 7.5 and about 9.9. The pH can be adjusted using various bases or buffering agents. Suitable bases or buffering agents include, for example, borax, sodium hydroxide, alkali phosphates, alkali silicates, alkali carbonates, ammonia, and amines such as diethanolamine or triethanolamine.

Another aspect of the invention provides a method for applying the polishing compositions of this invention. The polish can be applied to a variety of substrates including floor, wall, and bathroom surfaces. The substrates can be fibers, metal, plastic, wood, stone, brick, glass, cement, concrete, ceramic, masonite, dry wall, plaster, plastic, and the like. Bathroom surfaces can be countertops, shower stalls, toilets, and urinals. In one preferred embodiment, the substrate is a floor surface. The floor surface can be wood, vinyl, linoleum, asphalt, asbestos, concrete, ceramic, and the like.

Typically, between 1 and about 8 coats of the polishing composition are applied to the substrate. Consequently, the polishing composition must be capable of wetting both the substrate and coatings formed from the polishing composition. The surface tension of the polishing composition is typically adjusted to be lower than the surface energy of the substrate. For application to floor tiles, the surface tension of the polishing composition is adjusted by the addition of the ionic surfactant to be less than about 30 dynes/cm. The typical range of static surface tension is from about 18 to about 30 dynes/cm and preferably from about 23 to about 28 dynes/cm.

The polishing compositions of the present invention comprising an ionic silicone surfactant and a film-forming polymer can be applied to a substrate to produce coatings that are resistant to soiling. The polishes perform better than those containing nonionic silicone surfactants or hydrocarbon surfactants. Additionally, they perform as well as or better than state-of-the-art formulations containing fluorocarbons.

The following examples further describe the polishing compositions of the invention, methods of using the polishing compositions of the invention, and the tests performed to determine the various characteristics of the polishing composition. The examples are provided for exemplary purposes to facilitate understanding of the invention and should not be construed to limit the invention to the examples.

EXAMPLES

Glossary

Diethylene glycol monoethyl ether—fugitive plasticizer—available from Aldrich Chemical Company, Inc.; Milwaukee, Wis.

SE21—aqueous emulsion of silicone fluid—defoamer—available from Wacker Silicones Corp.; Adrian, Mich.

Kathon CG/ICP—mixture of two isothiazolinones—biocide—available from Rohm and Haas; Philadelphia, Pa.

Dibutyl phthalate—plasticizer—available from Aldrich Chemical Company, Inc.; Milwaukee, Wis.

KP-140—tributoxyethyl phosphate—plasticizer—available from Great Lakes Chemical Corporation; West Lafayette, Ind.

Mor-glo 2 latex—styrene/acrylic emulsion copolymer—film forming polymer—available from Omnova Solutions, Inc.; Chester S.C.

Syntran 3M280—acrylate copolymer—film forming polymer—available from Interpolymer Corporation; Canton, Mass.

MC-28—styrene/acrylic solution—alkali soluble resin—available from Omnova Solutions Inc.; Chester, S.C.

325 N 35L—high-density polyethylene emulsion—wax—available from ChemCor; Chester, N.Y.

43N40—polyolefin wax emulsion—wax—available from ChemCor; Chester, N.Y.

Tergitol TMN-6—highly branched lauryl ethoxylate—90% active surfactant containing a hydroxy end group and having an average molecular weight of 543—available from Union Carbide Corporation; Danbury, Conn.

Dynol 604—alkoxylated alkynol—100% active surfactant—available from Air Products and Chemicals, Inc.; Allentown, Pa.

Triton XL-80N—$C_8$ to $C_{10}$ primary alcohol alkoxylate—100% active surfactant containing a hydroxy end group and having an average molecular weight of 442—available from Union Carbide Corporation; Danbury, Conn.

Sodium dodecylbenzene sulfonate (DS10)—100% active surfactant—available from Aldrich Chemical; Milwaukee, Wis.

Sodium laurate—neutralization of lauric acid with sodium hydroxide—100% active surfactant—available from Stepan; Northfield, Ill.

Rodafac PE-510—nonoxynol-6-phosphate—100% active surfactant—available from Rhodia, Inc.; Marietta, Ga.

Silwet L-77—polyalkylene oxide modified heptamethyl trisiloxane—100% active silicone surfactant containing a methyl end group and 1 pendant group and having an average molecular weight of 645—available from OSi Specialties; Greenwich, Conn.

Silwet L-7608—polyalkylene oxide modified heptamethyl trisiloxane—100% active silicone surfactant containing a hydrogen end group and one pendant group and having an average molecular weight of 630—available from OSi Specialties; Greenwich, Conn.

MFF-199-SW—silicone copolyol—100% active silicone surfactant containing a hydrogen end group and one pendant polyethylene oxide group and having an average molecular weight between 600 to 1000—available from Lambent Technologies Inc.; Northcross, Ga.

SW-CP-K—silicone copolyol based carboxylate ester, potassium salt—40% active silicone surfactant containing a phthalate end group and one polyethylene oxide pendant group and having an average molecular weight between 800 and 1100—available from Lambent Technologies Inc.; Northcross, Ga.

Lube CPI—silicone copolyol based carboxylate ester, potassium salt—100% active silicone surfactant containing a phthalic acid end group and 3 to 5 pendant groups and having an average molecular weight between 2900 and 5300—available from Lambent Technologies Inc.; Northcross, Ga.

3M Spangle™ Floor Finish—a polish composition containing a fluorocarbon surfactant—available from 3M Company; St. Paul, Minn.

Test Methods

The film formation test at ambient conditions was done using 6 drops of finish, applied with a knife coater (10 mil gap and ¾" width) on a stripped tile. New Armstrong black vinyl composite tiles from St. Paul Linoleum, St. Paul, Minn. were used and were stripped using a 3M Super Polish™ (White) Floor Pad with 3M Low Odor Stripper (22H) diluted using Twist and Fill™ applicator—3M, St. Paul, Minn. The control finish (3M Spangle™ Floor Finish containing a fluorinated surfactant) was applied to each tile. Each formulation was coated on two different tiles. A visual rating was given in terms of wetting and leveling of the finish. The rating scale went from 1 to 5 with 5 being best. The Spangle™ control finish was given a rating of 5. The average rating of the formulation on the two different tiles was reported.

In the soiling test, new Armstrong white vinyl composite tiles from St. Paul Linoleum, St. Paul, Minn. were stripped as described above. A 1-ft² tile was divided in thirds and the Spangle™ control and 2 experimental polishes were applied to the same tile (1.3 mLs of each polish was used). Four coats of polish were applied and each coat was allowed to dry for at least 20 minutes. The tile was not tested until at least 24 hrs had passed. A Gardner Straight Line Washability and Abrasion Machine (Byk Gardner—Silver Spring, Md.) was used. A loop nylon kitchen style carpet was attached to the roller and 2 grams CSMA soil (Rohm & Haas, Philadelphia, Pa.) were placed on the carpet. After 25 cycles, the loose soil on the tile surface was removed and the machine was run for another 175 cycles. A visual rating was given in terms of soiling of the finish. The rating scale went from 1 to 5 with 5 being best. The Spangle™ control finish was given a rating of 5. The average rating of the formulation on the two different tiles was reported.

A Microflash® 200d instrument (Illum=d65/10° at 1 inch aperture—Data color International, Lawrenceville, N.J.) was used to measure the color change of the tile before and after soiling. Calculations were done using the CIELAB color space. Three measurements were taken for each formulation and the change in lightness ($\Delta L^*$) was determined. Although specific to the application, a rule of thumb would be that a $\Delta L^*$ of less than one is an acceptable color change. For each tile, the value of $\Delta L^*$ (average of the three readings) of the Spangle™ control as well as the two experimental formulations were recorded. Then, the $\Delta L^*$ value of the experimental formulation was subtracted from the $\Delta L^*$ value of the Spangle™ control (reference) which was coated on the same tile ($\Delta L^*\text{ref}-\Delta L^*\text{exp}$). This change in the $\Delta L^*$ value was recorded. Each formulation was coated on two different tiles. An average of the change in the $\Delta L^*$ value for each formulation (from two different tiles) was determined and reported. A negative value for this change of $\Delta L^*$ demonstrates that the experimental coating gave a better result than the reference Spangle™ coating.

Stock Solution

A floor finish stock solution (containing no surfactant) having the composition described in Table 1 was made. Ingredients numbered 1–4 were added and mixed for 15 minutes. Then ingredients numbered 5–6 were added and mixed for 15 minutes; ingredients 7–8 were added and mixed for 15 minutes. Ingredients 9–11 were added and the whole formulation was mixed for 30 minutes. An air mixer equipped with a stirring blade was used to mix the above ingredients.

TABLE 1

Floor Finish Stock Solution Ingredients

| # | Material | % Weight |
|---|---|---|
| 1 | deionized water | 46 |
| 2 | diethylene glycol monoethyl ether | 4.1 |
| 3 | SE21 | 0.02 |
| 4 | Kathon CG/ICP | 0.03 |
| 5 | dibutyl phthalate | 0.55 |
| 6 | KP-140 | 2.6 |
| 7 | Mor-glo 2 latex | 33 |
| 8 | Syntran 3M280 | 9.1 |
| 9 | MC-28 | 1.5 |
| 10 | 325 N 35L | 1.6 |
| 11 | 43N40 | 1.5 |

Surfactants were incorporated into the floor finish stock solution. Performance testing of these formulations included film formation ("smoothness" of the coating) at ambient conditions and soil resistance.

Comparative Example 1

Three different nonionic hydrocarbon surfactants were each separately incorporated into the floor finish stock solution at two different active levels (0.5% and 1.0% by weight of total solution). Tergitol TMN-6 was the surfactant in Comparative Example 1a, Dynol 604 was the surfactant in Comparative Example 1b, and Triton XL-80N was the surfactant in Comparative Example 1c. These solutions were mixed for at least 30 minutes using magnetic stir bars. These nonionic hydrocarbon surfactants showed poor anti-soiling properties (Table 2). When the concentration of the surfactant was increased from 0.5% to 1%, the soil resistance worsened. Also, the film made using the nonionic hydrocarbon surfactants did not appear as "smooth" as the film made from the 3M Spangle™ control polish (Table 2). Thus, the nonionic hydrocarbon surfactants did not match the wetting and leveling characteristics of the control floor finish.

Comparative Example 2

Three different ionic hydrocarbon surfactants were each separately incorporated into the floor finish stock solution at two different active levels (0.5% and 1.0% by weight of total solution). Sodium dodecylbenzene sulfonate (DS10) was the surfactant in Comparative Example 2a, sodium laurate was the surfactant in Comparative Example 2b, and Rhodafac PE-510 was the surfactant in Comparative Example 2c. These solutions were mixed for at least 30 minutes using magnetic stir bars. These ionic hydrocarbon surfactants showed poor anti-soiling properties (Table 2). Also, the film made using the sodium dodecylbenzene sulfonate surfactant did not appear as "smooth" as the film made from the control polish, 3M Spangle™ (Table 2).

Comparative Examples 3–5

Three different nonionic silicone surfactants (Silwet L-77 for Comparative Example 3, Silwet L-7608 for Comparative Example 4, and Lambent MFF-199-SW for Comparative Example 5) were each separately incorporated into the floor finish stock solution at two different active levels (0.5% and 1.0% by weight of total solution). These solutions were mixed for at least 30 minutes using magnetic stir bars. These nonionic silicone surfactants showed poor anti-soiling properties that worsened as their concentrations were increased (Table 2). The films made with these solutions approached the "smooth" appearance of the control finish (Table 2).

Example 1

An anionic silicone surfactant Lambent SW-CP-K was incorporated into the floor finish stock solution at two different active levels (0.5% and 1.0% by weight of total solution). This anionic silicone surfactant was a direct analog to the nonionic silicone surfactant discussed in Comparative Example 5. This solution was mixed for at least 30 minutes using a magnetic stir bar. Lambent SW-CP-K had minimal adverse affects on the final properties of the dried film i.e. maintained good anti-soiling properties (Table 2). The film made with this solution matched the "smooth" appearance of the control finish (Table 2). Thus, this silicone surfactant matched the wetting and leveling characteristics of the control floor finish.

Example 2

Lambent Lube CPI, a higher molecular weight anionic silicone surfactant (having a comb structure) was incorporated into the floor finish stock solution at two different active levels (0.5% and 1.0% by weight of total solution). This solution was mixed for at least 30 minutes using a magnetic stir bar. Lambent Lube CPI had minimal adverse affects on the final properties of the dried film i.e. maintained good anti-soiling properties (Table 2). The film made with this solution matched the "smooth" appearance of the control finish (Table 2). Thus, this silicone surfactant matched the wetting and leveling characteristics of the control floor finish.

When comparing nonionic silicone chemistries having similar film formation properties to anionic silicone surfactants, we observed that the anti-soiling characteristics of the formulations using the nonionic silicone surfactants were decreased. This increase in soiling could be measured by the colorimeter as well as being easily detected by the human eye.

TABLE 2

Results (Soiling and Film Formation) of Surfactants

| Sample | Surfactant | Wt-% Surfactant | Film Formation (Visual test) (1–5, 5 = best) | Soiling (Visual test) (1–5, 5 = best) | Soiling (ΔL*) |
|---|---|---|---|---|---|
| Control Polish - 3M Spangle ™ | Fluorinated surfactant | | 5 | 5 | 0 (by definition) |
| | Nonionic Hydrocarbon Surfactants: | | | | |
| Comparative Example 1a | Tergitol TMN-6 | 0.5% 1% | 3 4 | 4 3 | 2.6 5.2 |
| Comparative Example 1b | Dynol 604 | 0.5% 1% | 2.5 3 | 3 1 | 5.4 8.7 |
| Comparative Example 1c | Triton XL-80N | 0.5% 1% | 3 3 | 4 3 | 3.0 5.6 |
| | Ionic Hydrocarbon Surfactants: | | | | |
| Comparative Example 2a | DS10 | 0.5% 1% | 3 3 | 4 3 | 2.2 4.5 |
| Comparative Example 2b | Sodium Laurate | 0.5% 1% | 5 5 | 4.5 4 | 1.8 2.1 |
| Comparative Example 2c | Rhodafac PE-510 | 0.5% 1% | 5 5 | 4 3 | 2.7 4.7 |
| | Silicone Surfactants: | | | | |
| Comparative Example 3 | Silwet L-77 | 0.5% 1% | 4 5 | 4.5 3 | 2.2 5.4 |
| Comparative Example 4 | Silwet L-7608 | 0.5% 1% | 4.5 5 | 4 3 | 2.8 6.2 |
| Comparative Example 5 | Lambent MFF 199SW | 0.5% 1% | 5 5 | 3 1 | 4.7 7.1 |

TABLE 2-continued

Results (Soiling and Film Formation) of Surfactants

| Sample | Surfactant | Wt-% Surfactant | Film Formation (Visual test) (1–5, 5 = best) | Soiling (Visual test) (1–5, 5 = best) | Soiling (ΔL*) |
|---|---|---|---|---|---|
| Example 1 | Lambent | 0.5% | 5 | 5 | −0.4 |
|  | SW-CP-K | 1% | 5 | 5 | 0.6 |
| Example 2 | Lambent | 0.5% | 5 | 5 | 0.2 |
|  | CPI | 1% | 5 | 5 | 0.1 |

From the foregoing detailed description it will be evident that modifications can be made in the methods of the invention without departing from the spirit or scope of the invention. Therefore, it is intended that all modifications and variations not departing from the spirit of the invention come within the scope of the claims and their equivalents.

We claim:

1. An aqueous polishing composition for applying a coating to a substrate comprising:
   (a) a film-forming polymer; and
   (b) an ionic silicone surfactant,
wherein the coating is resistant to soiling.

2. The polishing composition of claim 1, wherein the substrate is selected from the group consisting of a floor, a wall, and a bathroom surface.

3. The polishing composition of claim 1, wherein the substrate is a floor surface.

4. The polishing composition of claim 1, wherein the ionic silicone surfactant is an anionic silicone surfactant.

5. The polishing composition of claim 4, wherein the anionic silicone surfactant contains a basic salt selected from the group consisting of a carboxylate, phosphonate, phosphate, sulfate, and sulfonate.

6. The polishing composition of claim 4, wherein the anionic silicone surfactant contains a carboxylate.

7. The polishing composition of claim 6, wherein the carboxylate is phthalate.

8. The polishing composition of claim 1, wherein the polishing composition contains from about 0.01 to about 5 weight percent of the ionic silicone surfactant.

9. The polishing composition of claim 1, wherein the polishing composition contains from about 0.1 to about 2 weight percent of the ionic silicone surfactant.

10. The polishing composition of claim 1, wherein the ionic silicone surfactant has an average molecular weight of less than about 10,000.

11. The polishing composition of claim 10, wherein the molecular weight is less than about 6,000.

12. The polishing composition of claim 1, wherein the polishing composition has a pH in the range of about 6 to about 10.5.

13. The polishing composition of claim 12, wherein the pH is in the range of about 7.5 to about 9.9.

14. The polishing composition of claim 1, wherein the ionic silicone surfactant further comprises a polyalkylene oxide.

15. The polishing composition of claim 14, wherein the polyalkylene oxide is a polyethylene oxide.

16. The polishing composition of claim 1, wherein the film forming polymer is selected from the group consisting of an acrylic polymer, an acrylic copolymer, a styrene-acrylic copolymer, and mixtures thereof.

17. The polishing composition of claim 1, wherein the polishing composition contains from about 5 to about 50 weight percent of the film forming polymer based on the weight of the polishing composition.

18. The polishing composition of claim 1, wherein the polishing composition contains from about 10 to about 35 weight percent of the film forming polymer based on the weight of the polishing composition.

19. The polishing composition of claim 1, wherein the polishing composition has a solids content ranging from about 10 to about 50 weight percent based on the weight of the polishing composition.

20. The polishing composition of claim 19, wherein the solids content ranges from about 10 to about 30 weight percent based on the weight of the polishing composition.

21. The polishing composition of claim 19, wherein the solids content ranges from about 35 to about 50 weight percent based on the weight of the polishing composition.

22. The polishing composition of claim 1, wherein the polishing composition has a surface tension between about 18 and about 30 dynes/cm.

23. The aqueous polishing composition of claim 1, further comprising an additive, wherein the additive is selected from the group consisting of a polyvalent metal compound, an alkali soluble resin, a wax, a plasticizer, a defoamer, and a biocide.

24. The polishing composition of claim 23, wherein the substrate is selected from the group consisting of a floor, a ceiling, and a bathroom surface.

25. The polishing composition of claim 23, wherein the substrate is a floor surface.

26. The polishing composition of claim 23, wherein the ionic silicone surfactant is an anionic silicone surfactant.

27. The polishing composition of claim 26, wherein the anionic silicone surfactant contains a basic salt selected from the group consisting of carboxylate, phosphonate, phosphate, sulfate and sulfonate.

28. The polishing composition of claim 26, wherein the anionic silicone surfactant contains a carboxylate.

29. The polishing composition of claim 28, wherein the carboxylate is phthalate.

30. The polishing composition of claim 23, wherein the polishing composition contains from about 0.01 to about 5 weight percent of the ionic silicone surfactant.

31. The polishing composition of claim 23, wherein the ionic silicone surfactant has an average molecular weight of less than about 10,000.

32. The polishing composition of claim 23, wherein the polishing composition has a pH in the range of about 6 to about 10.5.

33. The polishing composition of claim 23, wherein the ionic silicone surfactant further comprises a polyalkylene oxide.

34. The polishing composition of claim 23, wherein the film forming polymer is selected from the group consisting of an acrylic polymer, an acrylic copolymer, a styrene-acrylic copolymer, and mixtures thereof.

35. The polishing composition of claim 23, wherein the polishing composition has a solids content ranging from about 10 to about 50 weight percent based on the weight of the polishing composition.

36. The polishing composition of claim 23, wherein the polishing composition contains from about 5 to about 50 weight percent of the film forming polymer based on the weight of the polishing composition.

37. The polishing composition of claim 23, wherein the polishing composition contains from about 10 to about 35 weight percent of the film forming polymer based on the weight of the polishing composition.

38. The polishing composition of claim 23, wherein the polishing composition has a surface tension between about 18 and about 30 dynes/cm.

39. A method of polishing a substrate comprising coating the substrate with a polishing composition according to claim 1.

40. The method of claim 39, wherein the substrate is selected from the group consisting of a floor, a wall, and a bathroom surface.

41. The method of claim 39, wherein the substrate is a floor surface.

42. A method of polishing a substrate comprising coating the substrate with a polishing composition according to claim 23.

43. The method of claim 42, wherein the substrate is selected from the group consisting of a floor, wall, and ceiling surface.

44. The method of claim 42, wherein the substrate is a floor surface.

* * * * *

UNITED STATES PATENT AND TRADEMARK OFFICE
CERTIFICATE OF CORRECTION

PATENT NO. : 6,579,923 B2
DATED : June 17, 2003
INVENTOR(S) : Yarmey, Susan K.

It is certified that error appears in the above-identified patent and that said Letters Patent is hereby corrected as shown below:

Column 1,
Line 32, please delete "affects" and insert -- effects --.
Line 47, please insert -- et al. -- following "Gehman".

Column 2,
Line 10, please insert -- the -- following "of".
Line 16, please delete "affects" and insert in place thereof -- effects --.
Line 21, please delete "surfactant" and insert in place thereof -- surfactants --.

Column 3,
Line 56, please delete "acrylate acid" and insert in place thereof -- acrylic acid --.
Line 65, please insert -- are -- preceding "available".

Column 4,
Line 45, please delete "α-ө-" and insert -- α- β- --.

Column 5,
Line 3, please insert -- of -- following "weight".

Column 6,
Line 37, please insert -- , -- following "Chester".
Line 64, please delete "Rodafac" and insert -- Rhodafac --.

Column 7,
Lines 13, 19 and 25, please delete "Northcross" and insert in place thereof
-- Norcross --.
Line 64, please delete "Data color" and insert in place thereof -- Datacolor --.

UNITED STATES PATENT AND TRADEMARK OFFICE
CERTIFICATE OF CORRECTION

PATENT NO. : 6,579,923 B2
DATED : June 17, 2003
INVENTOR(S) : Yarmey, Susan K.

It is certified that error appears in the above-identified patent and that said Letters Patent is hereby corrected as shown below:

Column 10,
Lines 4 and 19, please delete "affects" and insert in place thereof -- effects --.

Signed and Sealed this

Twentieth Day of July, 2004

JON W. DUDAS
*Acting Director of the United States Patent and Trademark Office*